United States Patent [19]

Moser

[11] 4,090,982

[45] May 23, 1978

[54] HYDRODESULFURIZATION CATALYST

[75] Inventor: William R. Moser, Wayland, Mass.

[73] Assignee: Exxon Research & Engineering Co., Linden, N.J.

[21] Appl. No.: 727,271

[22] Filed: Sep. 27, 1976

Related U.S. Application Data

[62] Division of Ser. No. 639,867, Dec. 11, 1975, Pat. No. 4,018,672.

[51] Int. Cl.$^2$ .................. B01J 21/04; B01J 23/84; B01J 23/88
[52] U.S. Cl. .................................... 252/465; 252/439
[58] Field of Search ........................... 252/465, 439

[56] References Cited

U.S. PATENT DOCUMENTS

| | | | |
|---|---|---|---|
| 3,900,430 | 8/1975 | Beaty | 252/465 X |
| 3,935,127 | 1/1976 | Conway | 252/465 |

*Primary Examiner*—W. J. Shine
*Attorney, Agent, or Firm*—Marthe L. Gibbons

[57] ABSTRACT

A catalyst is provided which comprises a hydrogenation component composited with an alumina support prepared by hydrolyzing an aluminum alcoholate to aluminum hydroxide and thermally decomposing the aluminum hydroxide in a solvent at a temperature above the critical temperature of the solvent. A preferred catalyst is cobalt-molybdenum on alumina. Also provided is a hydrodesulfurization process utilizing said catalyst.

9 Claims, No Drawings

HYDRODESULFURIZATION CATALYST

This is a division of application Ser. No. 639,897, filed Dec. 11, 1975, now U.S. Pat. No. 4,018,672.

BACKGROUND OF THE INVENTION

1. Field of the Invention

This invention relates to a catalyst and process for hydrodesulfurization of mineral oils. More particularly, this invention relates to a catalyst comprising a hydrogenation component composited with an alumina support characterized by a unique solid state structure resulting from its method of preparation.

2. Description of the Prior Art

Hydrodesulfurization processes in which heavy hydrocarbon distillates or residual fractions are hydrotreated with hydrogen in the presence of a catalyst comprising a hydrogenation component composited with a refractory oxide support, such as alumina, are well known (see, for example, U.S. Pat. No. 3,531,398; U.S. Pat. No. 3,509,044 and U.S. Pat. No. 3,770,618).

Hydrodesulfurization catalysts having specified physical characteristics such as pore size distribution have been proposed to overcome disadvantages of conventional prior art catalysts.

U.S. Pat. No. 3,876,523 discloses a hydrodemetallization and hydrodesulfurization alumina base catalyst having an average pore diameter between 150 to 250 Angstroms.

U.S. Pat. No. 3,891,541 discloses a demetallization and desulfurization catalyst comprising a hydrogenation component composited with an alumina support, the pores of which are distributed over a narrow 180 to 300 Angstrom diameter range and having a surface area in the range of 40 to 70 m$^2$/g.

U.S. Pat. No. 3,393,148 discloses a hydroprocessing catalyst comprising a hydrogenation component and a large pore diameter alumina having a surface area ranging from 150 to 500 m$^2$/g and an average pore diameter ranging from 100 to 200 Angstroms.

U.S. Pat. No. 3,471,399 discloses a hydrodesulfurization catalyst comprising silica-alumina and a hydrogenation component, said catalyst having an average pore diameter ranging from 70 to 90 Angstroms and a surface area of about 150 to 250 square meters.

U.S. Pat. No. 3,322,666 discloses a hydrodesulfurization catalyst comprising a hydrogenation component and an activated alumina having less than 5 percent of its pore volume, that is in the form of pores having a radius of 0 to 300 Angstroms and less than 10 percent of its pore volume in pores larger than 80 Angstrom radius.

It has now been found that a hydrodesulfurization catalyst comprising an alumina carrier having a specific solid state structure resulting from the method of its preparation provides advantages that will become apparent in the ensuing description.

SUMMARY OF THE INVENTION

In accordance with the invention there is provided, in a process for the hydrodesulfurization of a sulfur-containing hydrocarbon oil which comprises contacting said oil under hydrodesulfurization conditions with hydrogen and a catalyst comprising an alumina-containing support composited with a hydrogenation component, said hydrogenation component comprising at least one Group VIB metal component and at least one Group VIII metal component, the improvement which comprises said alumina having been prepared by hydrolyzing an aluminum alcoholate to aluminum hydroxide, thermally decomposing said aluminum hydroxide in a solvent at a temperature above the critical temperature of said solvent.

Furthermore, in accordance with the invention, there is also provided a catalyst comprising an alumina-containing support composited with a hydrogenation component selected from the groups consisting of at least one Group VIB metal component and at least one Group VIII metal component, said alumina having been prepared by hydrolyzing an aluminum alcoholate to aluminum hydroxide, thermally decomposing said aluminum hydroxide in a solvent at a temperature above the critical temperature of said solvent.

DESCRIPTION OF THE PREFERRED EMBODIMENTS

A sulfur-containing heavy hydrocarbon feedstock is contacted in a hydrodesulfurization zone with hydrogen and the catalyst of the present invention under hydrodesulfurization conditions to produce a hydrocarbon product having a reduced content of sulfur.

HEAVY HYDROCARBON FEEDSTOCKS

The heavy hydrocarbon feedstock utilized in the present invention comprises hydrocarbons boiling above 650° F. (343.33° C.) at atmospheric pressure which contain substantial quantities of material boiling above 1,000° F. (537.78° C). The process is particularly suited for treating heavy crude mineral oils, residual petroleum oil fractions, such as fractions produced by atmospheric and vacuum distillation of crude oils. Such residual oils usually contain large amounts of sulfur and metallic contaminants such as nickel and vanadium. The total metal content of such oils may range up to 2,000 weight parts per million or more and the sulfur content may range up to 8 weight percent or more. The Conradson carbon residue of these heavy hydrocarbon feeds will generally range from about 5 to about 50 weight percent (as to Conradson carbon residue, see ASTM test D-189-65). The preferred process feedstock is a petroleum residuum obtained from distillation or other treating or separation process. From about 30 to about 100 percent of the petroleum residuum feed boils above 900° F. (482,22° C.) at atmospheric pressure. Other suitable feedstocks include heavy hydrocarbons recovered from tar sands; synthetic crude oils recovered from oil shales; heavy oils produced from the liquefaction of coal, and the like, and mixtures of any of these feeds. The hydrocarbon feeds will generally contain at least 10 percent of materials boiling above 1,000° F. (537.78° C.) (at atmospheric pressure).

OPERATING CONDITIONS IN THE HYDRODESULFURIZATION ZONE

The operating conditions in the hydrodesulfurization zone include a temperature ranging from about 100° C. (212° F.) to about 750° C. (1382° F.), preferably a temperature ranging from about 300° C. (572° F.) to about 500° C. (932° F.), a hydrogen partial pressure ranging from about one atmosphere to about 10,000 psig, preferably from about 30 psig to about 1000 psig, for example, about 175 psig; a liquid hourly space velocity ranging from about 0.5 volumes of hydrocarbon feed per hour per volume of catalyst to about 30 volumes of hydrocarbon feed per catalyst (V/V/Hr.), preferably from about 1.0 V/V/Hr. to about 5.0 V/V/Hr., and a hydrogen rate of about 2 to about 200 standard cubic feet per barrel of hydrocarbon feed.

THE HYDRODESULFURIZATION CATALYST

The hydrodesulfurization catalyst of the present invention utilized in the hydrodesulfurization zone comprises a hydrogenation component and an alumina-containing support. The alumina constituent of the catalyst of the present invention is prepared by a thermal decomposition of aluminum alcoholates according to the method described in the publication J. L. Gass and S. J. Teichner in Bull. Soc. Chim., France, 1972 (6)2209-13, see also Ibid 1973 (2)429-35.

Generally, the method comprises a careful hydrolysis of an aluminum alcoholate (for example, an aluminum butylate) to produce aluminum hydroxide followed by a thermal decomposition of the aluminum hydroxide in a solvent at a temperature above the critical temperature of the solvent. Maintaining the solvent at a temperature above the critical temperature of the solvent is a critical step in the synthesis of alumina support material of the catalyst of the present invention. Suitable solvents include alcohols, preferably the lower boiling alcohols such as $C_1$ to $C_4$ alcohols, acetone, methyl ethyl ketone, cyclic ethers, tetrahydrofuran and the like. The given thermal decomposition is believed to result in the intermediate formation of a layerlike Boehmite structure (AL O(OH)). Suitable thermal decomposition temperatures range from above the critical temperature of the particular solvent used to about 980° C., preferably from about 700° C to about 980° C.

The specified thermal decomposition conditions are believed to cause an exfoliation of the Boehmite to the final alumina which has a unique solid state structure which enables it to incorporate the hydrogenation component over its entire surface.

When an alumina prepared according to the above given Gass and Teichner method is composited with a hydrogenation component, it has been found that the resulting catalyst posesses superior hydrodesulfurization activity.

The preferred hydrogenation component of the catalysts of the present invention is selected from the group consisting of at least one elemental metal, metal oxide or metal sulfide of a Group VIB metal and at least one elemental metal, metal oxide or metal sulfide of a Group VIII metal of the Periodic Table of Elements. The Periodic Table referred to herein is in accordance with the *Handbook of Chemistry and Physics* published by the Chemical Rubber Publishing Company, Cleveland, Ohio, 45th edition, 1964. The preferred Group VIB metal component is selected from the group consisting of molybdenum oxide, molybdenum sulfide, tungsten oxide, tungsten sulfide and mixtures thereof and the preferred Group VIII metal component is selected from the group consisting of nickel oxide, nickel sulfide, cobalt oxide, cobalt sulfide and mixtures thereof. The support of the catalyst is an alumina-containing support, that is, the support is predominantly alumina prepared as indicated above which may be composited with minor amounts of other inorganic oxides such as silica. Preferably, the support consists essentially of alumina.

When the catalyst contains metal oxide hydrogenation components, the catalyst is preferably sulfided prior to use in a conventional way.

Suitable ranges of hydrogenation component include from about 1 to about 10 weight percent, preferably from about 5 to about 10 weight percent of Group VIB metal component, calculated as the elemental metal based on the total catalyst, and from about 1 to about 5 weight percent, preferably from about 1 to about 3 weight percent of a Group VIII metal component calculated as the elemental metal based on the total catalyst. A preferred catalyst composition is as follows:

| Catalyst Composition | Broad Range | Preferred Range |
| --- | --- | --- |
| Nickel or cobalt, wt. % | 1 to 5 | 1 to 3 |
| Tungsten or molybdenum, wt. % | 1 to 10 | 5 to 10 |
| Alumina | Balance | Balance |

The most preferred catalyst comprises 8 weight percent molybdenum and 2.3 weight percent cobalt on alumina prepared by previously described thermal decomposition method.

The hydrogenation component can be composited with the alumina support in a conventional manner, such as, for example, by impregnating alumina having the desired solid state structure with salts of the desired hydrogenation metals. The following examples are presented to illustrate the invention.

EXAMPLE 1

A sample of alumina was prepared according to the method of Gass and Teichner as follows.

Alumina sec-butoxide (190.22 g, 0.393 mole) and 750 ml. of sec-butyl alcohol were added to a reaction flask inside a dry box.

The flask was then removed to the laboratory bench where its contents were stirred under a blanket of nitrogen. Then 18.01 g (1.179 moles) of water were added dropwise over 15 minutes. The resulting gelatinous precipitate (aluminum hydroxide) was filtered under a blanket of nitrogen. The wet cake was then transferred to a 1 liter glass lined autoclave along with 200 ml. of methanol and heated to 250° C. for 30 minutes. Then the pressure of about 1200 psig was released over a period of 30 minutes. The autoclave was quickly cooled to room temperature by use of an ice bath, during which time helium was briskly passed through the autoclave. In this manner, 27.3 g of a low density alumina was recovered. This particular preparation resulted in an alumina having a surface area of 941 $m^2-g^{-1}$.

Increasing the amount of methanol utilized or higher autoclave temperatures resulted in alumina materials having the following typical surface areas: 797; 713; 702; 630; 545; 560 and 623 $m^2-g^{-1}$. These alumina materials were then blended. Ten grams of alumina prepared as indicated above and having a surface area of about 700 $m^2-g^{-1}$ was placed in a closed vapor saturation chamber with excess water at ambient temperature for 16 hours. Then a solution of 1.6 g of ammonium molybdate •$4H_2O$ in 7.0 g of water was impregnated into the water vapor treated sample of alumina. Following impregnation, the material was placed into a ceramic boat in a quartz tube contained in a tube furnace. There it was heated at 88° C. for 1 hour under a stream of pure oxygen flowing at 20 ml./minute. It was slowly heated over 2 hours to a temperature of 540° C. where it was held for 1 hour under the same oxygen flow. After cooling, the powder was again placed into the water vapor saturated chamber for 16 hours. Then 1.194 g of $Co(No_3)_2•6H_2O$ in 7.0 g of water were used to impregnate the above sintered solid utilizing identical sintering procedures. This preparation gave catalysts whose surface areas ranged between about 200 and $\frac{3}{8}$ m$^2$–g$^{-1}$. One of these catalysts, that is, the catalyst having a surface area of 213 m$^2$–g$^{-1}$, to be designated herein as catalyst A, was utilized in hydrodesulfurization tests.

EXAMPLE 2

Catalyst A was presulfided in a conventional manner by passing a stream of hydrogen sulfide in hydrogen over the catalyst. Subsequently, a feedstream consisting of 5 percent dibenzothiophene in a hydrocarbon mixture was passed over the catalyst at 350° C., 175 psig hydrogen pressure, utilizing a liquid flow velocity of 3.3 V/V/Hr. and a hydrogen flow rate of 40 ml./minute. This catalyst desulfurized the stream substantially completely. The average rate over five runs utilizing catalyst A under the given conditions was $27.2 \times 10^{-10}$ moles of sulfur removed per second per square meter of catalyst, $57.0 \times 10^{-8}$ moles of sulfur removed per second per gram of catalyst, and $22.8 \times 10^{-8}$ moles of sulfur removed per second per ml. of catalyst. Parallel runs using a prior art conventional catalyst under indentical conditions showed mean reactivities of $5.2 \times 10^{-10}$ moles per second per square meter, $13.2 \times 10^{-8}$ mole per second per gram and $9.5 \times 10^{-8}$ moles per second per ml. of catalyst.

EXAMPLE 3

Catalyst A was used to desulfurize the feedstream described in Example 2 under similar conditions to those described in Example 2 except that the reactor temperature was set at 450° C. and a much higher liquid space velocity of 6.6 V/V/Hr. was used. Catalyst A maintained 100 percent desulfurization activity over the test time of 3 hours whereas the prior art conventional catalyst was rapidly decreasing its own rate of desulfurization during the test period. Catalyst A was desulfurizing the stream at the rate of $48.3 \times 10^{-8}$ moles per second per gram of catalyst after 3 hours whereas the comparative prior art catalyst was showing a rate of $19.3 \times 10^{-8}$ mole-second$^{-1}$-gram$^{-1}$.

EXAMPLE 4

Desulfurization activity using conditions similar to the tests in Example 2 but using a reactor temperature of 450° C. demonstrated mean reactivities for the catalyst A of $24.6 \times 10^{-10}$ mole-second$^{-1}$-m$^{-2}$, $49.2 \times 10^{-8}$ mole-second$^{-1}$-g$^{-1}$, and $19.7 \times 10^{-8}$ mole-second$^{-1}$ml.$^{-1}$. Under similar conditions a low reactivity was observed for the comparative prior art catalyst, the reactivities being $9.6 \times 10^{-10}$ mole-second$^{-1}$-m$^2$, $24.6 \times 10^{-8}$ mole-second$^{-1}$-g$^{-1}$, and $17.6 \times 10^{-8}$ mole-second$^{-1}$ml.$^{-1}$ of catalyst.

What is claimed is:

1. In a catalyst comprising an alumina support composited with a hydrogenation component, said hydrogenation component being selected from the group consisting of at least one elemental metal, metal oxide and metal sulfide of a Group VIB element of the Periodic Table of Elements and at least one elemental metal, metal oxide and metal sulfide of a Group VIII element of the Periodic Table of Elements, said Group VIII element being selected from the group consisting of nickel, cobalt and mixtures thereof, the improvement which comprises said alumina having been prepared by hydrolyzing an aluminum alcoholate to aluminum hydroxide and thermally decomposing said aluminum hydroxide in a solvent selected from the group consisting of $C_1$ to $C_4$ alcohols, acetone, methylethylketone, cyclic ethers and terahydrofuran, at a temperature ranging from above the critical temperature of said solvent to a temperature of about 980° C.

2. The catalyst of claim 1, wherein said aluminum alcoholate is an aluminum butylate.

3. The catalyst of claim 1, wherein said thermal decomposition is conducted at a temperature ranging from about 700° to about 980° C.

4. The catalyst of claim 1, wherein said solvent is methanol.

5. The catalyst of claim 1, wherein said Group VIB metal component is selected from the group consisting of molybdenum oxide, molybdenum sulfide, tungsten oxide, tungsten sulfide and mixtures thereof and wherein said Group VIII metal component is selected from the group consisting of nickel oxide, cobalt oxide, nickel sulfide, cobalt sulfide and mixtures thereof.

6. The catalyst of claim 1, wherein said support consists essentially of alumina.

7. The catalyst of claim 1, wherein said catalyst comprises from about 1 to about 10 weight percent of a Group VIB metal component calculated as the elemental metal based on the total catalyst and from about 1 to about 5 weight percent of a Group VIII metal component calculated as the elemental metal based on the total catalyst.

8. The catalyst of claim 1, wherein said catalyst comprises from about 5 to about 10 weight percent of a Group VIB metal component, calculated as the elemental metal based on the total catalyst, and from about 1 to about 3 weight percent of a Group VIII metal component, calculated as the elemental metal based on the total catalyst.

9. The catalyst of claim 1, wherein said catalyst comprises about 8 weight percent molybdenum and about 2.3 weight percent cobalt.

* * * * *